INVENTORS
JOHN PAULKOVICH
FLOYD E. FORD

ATTORNEYS

United States Patent Office 3,541,422
Patented Nov. 17, 1970

3,541,422
COULOMETER AND THIRD ELECTRODE BATTERY CHARGING CIRCUIT
John Paulkovich, Lanham, and Floyd E. Ford, Davidsonville, Md., assignors to the United States of America as represented by the Administrator of the National Aeronautics and Space Administration
Filed May 29, 1969, Ser. No. 828,983
Int. Cl. H02j 7/04; H01m 45/04
U.S. Cl. 320—39                    8 Claims

ABSTRACT OF THE DISCLOSURE

A battery charging circuit wherein all available current to a battery is controlled through the use of a coulometer connected in parallel with a current limiting means such as a trickle resistor. At least one of the battery cells is of the type having a third electrode which is connected to a third electrode resistor in series with the trickle resistor. A voltage sensing circuit detects the sum of voltage across the coulometer and the third electrode. When the sum of the voltages exceeds a predetermined level, the sensing circuit actuates a control means, e.g., dissipating or switching regulator, for preventing further flow of charging current to the battery. Additionally, the device may be further provided with a current limiting resistor connected in series with the coulometer, and either in series with or in parallel with the trickle resistor.

ORIGIN OF THE INVENTION

The invention described herein was made by employees of the United States Government and may be manufactured and used by or for the Government for governmental purposes without the payment of any royalties thereon or therefor.

The present invention relates to battery charging apparatus, and, more particularly, to a charging circuit for nickel-cadmium batteries operating with charging and discharging cycles of varied durations. For example, such batteries are particularly adapted for supplying power to electrical loads of outer-space satellite vehicles. Charging current for the battery is supplied by the output available from sun illuminated solar cells. Accordingly, the charging and discharging cycles of the battery are determined by the time periods within which the solar cells are illuminated, when the cells are non-illuminated, no charging circuit is available for the battery.

Prior art battery charging devices possess numerous disadvantages, primarily resulting from the problem of preventing battery overcharging. When nickel-cadmium batteries are overcharged, excessive heat is generated together with liberation of gaseous oxygen, the excessive internal pressures of which would rupture the battery cell seals and ultimately result in battery failure. To prevent such occurrences, one prior art device operates to limit charging current at a constant low level. Because of the low level charging current, extended time periods for charging the battery must be readily available. Accordingly, without extended periods of solar cell illumination in order to charge the battery, only limited ampere-hours capacity of the battery is available.

According to a constant potential battery charging system, all available current from a solar cell source is accepted for charging the battery. A fast recharge time of the battery is thus attainable. However, when the full charged condition of the battery is attained, the flow of charging current must be precisely interrupted to prevent dangerous battery overcharging. Additionally, if but a single cell of a battery fails, the constant potential type charging apparatus will continue to charge the battery until failure thereof occurs. A further disadvantage is that the voltage characteristics of a nickel-cadmium battery is temperature dependent. Accordingly, the fully charged condition of the battery is detected only with difficulty.

A coulometer controlled device according to the prior art provides an abrupted signal for stopping further supply of charging current to the battery when the ampere-hours expended by the battery have been replaced by the charging current. Because a nickel-cadmium battery is only 85-90% efficient, the battery is not fully charged when this signal occurs.

According to other prior art charging apparatus, at least one cell of the battery is provided with a third electrode which senses the oxygen partial pressure within the cell and provides a voltage output proportional to the sensed pressure. Whereas, the third electrode voltage signal effectively ceases flow of charging current to the battery, it is characterized by a slow response to the actual pressure present in the battery cell.

The present invention eliminates the disadvantages present in prior art battery charging devices. More specifically, the present invention permits initial charging of the battery by a current level determined by the entire available output from a solar cell array, or at a current level determined by a limiter type circuit. According to the invention at least one cell of the battery being charged is provided with a third electrode connected to a third electrode resistor in series with a coulometer. A trickle resistor is connected in parallel with the coulometer and in series with the third electrode resistor. A voltage level sensing circuit detects the sum of voltages across the coulometer and the third electrode resistor and operates a regulator in series or parallel with the battery. In operation, charging current is initially supplied to the battery through the coulometer at a rate limited only by the output available from a solar cell array. Alternatively, the initial charging current level may be limited by provision of a current limiting resistor in series with the coulometer. When the coulometer detects the condition that the ampere-hours utilized during battery discharge have been replaced by the initial charging current, it attains the well-known "set" condition, and becomes the equivalent of a high resistance to the flow of charging current. The charging current then supplies the battery through the trickle resistor and is thereby abruptly changed to a selected reduced level determined by the ohmic values of the resistor. At this point the nickel-cadmium battery is not fully charged due to its inefficiency. Accordingly, charging of the battery continues at the reduced level of charging current, allowing continued charging of a battery into a relatively low overcharged condition. The sum of voltages across the trickle resistor and the third electrode resistor is maintained at a maximum level by the sensing circuit. More specifically, if voltage sum exceeds a predetermined level, the sensing circuit operates the regulator to prevent further flow of charging current to the battery. With the voltage sum thus controlled, the charging current level progressively decreases as the battery attains its safe level overcharge condition. This phenomenon occurs because the voltage across the third electrode resistor progressively increases in response to oxygen partial pressure in the battery as it attains its safe overcharge condition. Accordingly, the minimum level of charging current is determined by the ohmic value selected for the third electrode resistor. Such level may thereby be adjustably selected in accordance with requirements for orbital conditions of the space craft utilizing the battery and the conditions of minimum heat generation and oxygen partial pressure built up due to excessive overcharging. Accordingly, the combination of the coulometer and the third electrode provides a controlled circuit adaptable to maintain a nickel-cadmium battery in ultimate charged condition through varying sunlight to shadow time periods for the solar cell array. The charging circuit advantageously is not functionally dependent upon battery voltage which ordinarily varies with temperature. Additionally, a shorted cell in the battery will not allow the charging circuit according to the invention to dangerously overcharge the remaining cells of the battery. The initial level of charging current available by utilization of the present invention overcomes the disadvantages contributed to the constant potential charging devices. The overcharging problem experienced with third electrode type devices is eliminated since the coulometer of the present invention reduces the level of charging current before the battery becomes dangerously overcharged. The reduced level charging current is adaptable for either short or extended sunlight periods, since the third electrode signal progressively reduces the level of charging current as the battery approaches and surpasses somewhat a fully charged condition.

Accordingly, it is an object of the present invention to provide a nickel-cadmium battery charging circuit which permits initial charging of the battery at a relatively high charging current level and which progressively reduces the charging current level as the battery becomes fully charged.

A further object of the invention is to provide a nickel-cadmium battery charging apparatus wherein a coulometer terminates the supply of initially high level charging current and a third electrode of a battery cell is provided with a third electrode resistor for progressively reducing the level of charging current as the battery becomes recharged.

Another object of the invention is to provide a battery charging circuit wherein initial battery charging current is supplied at a level determined by the available output of a source of power, e.g., a solar cell array or, alternatively, by a current limiter device of the battery charging circuit.

It is yet another object of the invention to provide a nickel-cadmium battery charging circuit wherein a sensing circuit is responsive to the combined voltage drop across a third electrode resistor and a trickle resistor to actuate a regulator for preventing further flow of charging current to the battery being charged.

Other objects and many attendant advantages of the present invention will become apparent upon perusal of the following detailed description taken in conjunction with the accompanying drawings wherein.

Figure 1:
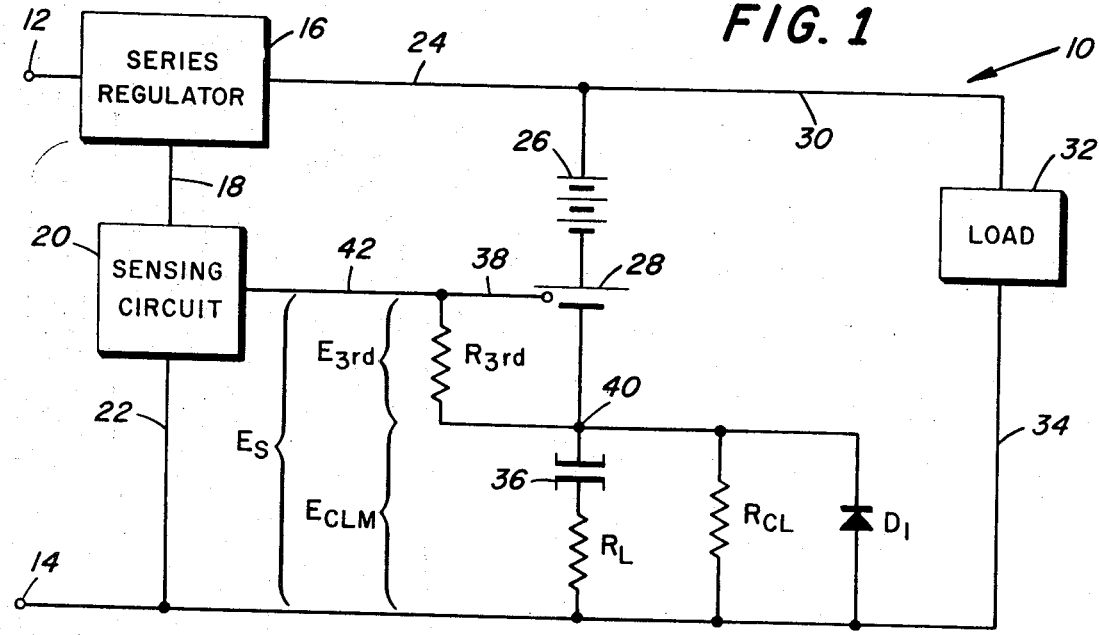
FIG. 1 is a schematic diagram of a preferred embodiment of the present invention and particularly illustrating a series regulator thereof.

With more particular reference to FIG. 1 of the drawings, there is shown generally at 10 a preferred embodiment of the battery charging circuit according to the invention. A pair of terminals 12 and 14 are adapted for connection to a source of charging current for the battery to be charged; for example, such source of charging current could comprise a solar cell array (not shown). The terminal 12 is connected to a series regulator, generally indicated at 16, which regulator may comprise either a series dissipating or a series switching type. The regulator 16 is connected electrically by way of a conductor, indicated schematically at 18, to a sensing circuit, schematically indicated at 20. The sensing circuit is electrically connected by way of a schematically indicated conductor 22 to the terminal 14. The series regulator 16 is provided with a schematically indicated conductor 24 connecting the regulator in series with a battery, schematically indicated at 26. The battery 26 comprises, for example, a plurality of nickel-cadmium cells, at least one of which cells is a third electrode type, shown schematically at 28. The battery 26, together with its third electrode cell or cells 28, is connected to the terminal 14 through a coulometer 36 and a current limiting resistor $R_L$ and a trickle resistor $R_{CL}$ is connected in parallel with the coulometer 36 and the current limiting resistor $R_L$. Additionally, it is noted that a diode $D_1$ is connected in parallel with the trickle resistor $R_{CL}$. The battery 26 is connected by way of a conductor, indicated schematically at 30, to a load 32, which is in turn connected by conductor 34 to the junction of current limiting resistor $R_L$ and the terminal 14. Diode $D_1$ provides an alternate path around the coulometer for the battery discharge current should coulometer 36 be fully "set" in the discharge direction and is mainly a protection device for the coulometer.

In normal use of the battery 26, ampere-hours are discharged therefrom and supplied along the conductor 30 to the load 32, a completed circuit between the battery and the load advantageously being provided along the conductor 34, the current limiting resistor $R_L$ and the coulometer 36. Such discharge of the battery 26 occurs during time periods within which the solar cell array, connected between the terminals 12 and 14, is without illumination or if the load requirements exceed the available current. Accordingly, in the well known manner, the load 32 is supplied with power either from the illuminated solar cell array or, alternatively, by the battery 26 when the solar cell array is not illuminated.

When illuminated, the solar cell array not only supplies required power to the load 32, but also supplies power to recharge the battery 26 which has previously supplied power to the load during a time period within which the solar cell array was not illuminated. Accordingly, the present invention is particularly directed toward the concept and circuitry, the operating of which will be described in detail hereinafter, for protecting the battery 26 from overcharge by charging current supplied by the solar cell array.

The third electrode cell 28 of the battery is shown provided with an electrical terminal 38 particularly for connection to the third electrode of the cell 28. The third electrode terminal 38 is provided with a third electrode resistor $R_{3rd}$ connected to the junction 40 of the coulometer 36 with the third electrode cell 28. The terminal 38 is additionally provided with a conductor 42 adapted for electrical connection to the sensing circuit 20.

Figure 4:
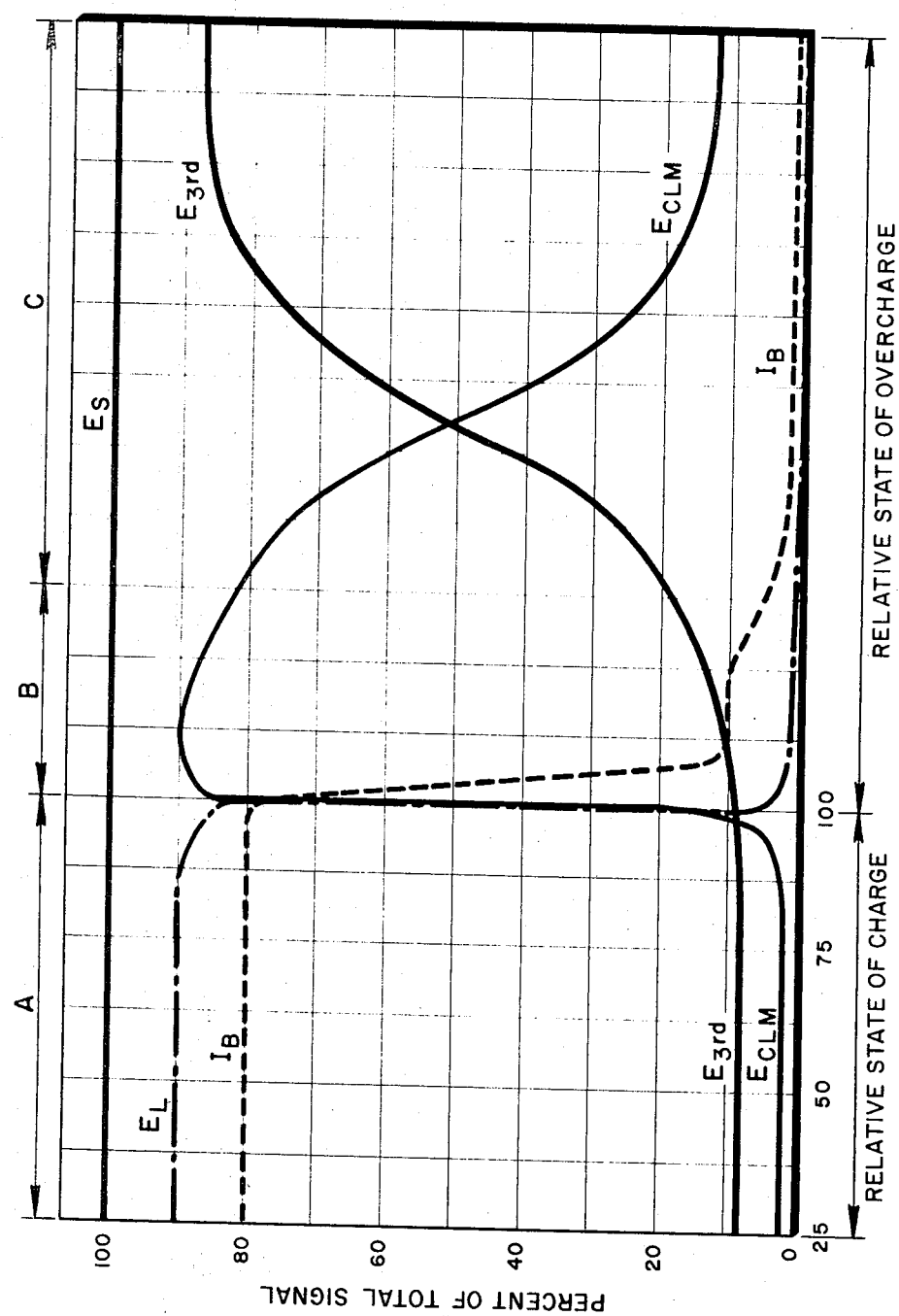
FIG. 4 is a graph plotting the relative levels of voltages across the components of the present invention vs. the relative state of charge or overcharge of a battery to be charged by the embodiments of the present invention.

With more particular reference to both FIGS. 1 and 4, the relative state of charge or overcharge of the battery 26 will be indicated to the sensing circuit 20 in the form of a sensing voltage $E_S$ defined by the equation:

$$E_S = E_{3rd} + E_{CLM}$$

wherein $E_{3rd}$ is a voltage across resistor $R_{3rd}$ derived from the third electrode cell 28, and $E_{CLM}$ is a voltage equal to the voltage across the coulometer 36 and the limit resistor $R_L$.

Additionally it is noted by reference to FIG. 1, that $E_{CLM}$ is also equal to the voltage across the trickle resistor $R_{CL}$.

Sensing voltage $E_S$ is monitored by the sensing circuit 20, which sensing circuit is constructed and arranged in any well known manner so as to actuate the series regulator 16 when the level of the sensing voltage $E_S$ reaches a predetermined limit. More specifically, the series regulator 16, when activated by the sensing circuit 20 will operate to control the level of charging current to the battery 26. When the solar cell array, not shown, is illuminated, charging current will be supplied through the series regulator 16 to the battery 26. The limit resistor $R_L$ in series with the battery 26 is provided purposely to limit the level of charging current initially supplied to the battery. It is apparent that the larger the ohmic value of the current limiting resistor, the lower will be the level of initial charging current supplied to the battery. Generally it is of low ohmic value to minimize power losses. It is apparent that the current limiting resistor may be eliminated, in which case the battery 26 will be supplied with the entire available current generated by the illuminated solar cell array. It should be understood that the total current supplied by the solar cell array is not entirely available to charge the battery 26, but is supplied for other purposes, for example, for supplying power to the load 32, It is assumed that the battery 26 is in a relative low state of charge when initial charging current is supplied thereto. It is well known in the prior art that a nickel-cadmium battery, such as the battery 26, will generate increasing amounts of oxygen as it approaches overcharge. Accordingly, since each cell of the battery is sealed, the internal partial pressure of the cell due to the presence of generated oxygen increases directly with the overcharge level of the battery. Accordingly, the third electrode type cell or cells 28 of the nickel-cadmium battery 26 is provided with a third electrode, not shown, which adsorbs the oxygen generated in the cell and provides a signal voltage over the terminal 38 in direct proportion to the oxygen partial pressure present in the cell or cells 28. Accordingly, the voltage across the third electrode resistor $R_{3rd}$ is represented in FIG. 1 as $E_{3rd}$ and is due entirely to the third electrode voltage supplied at the terminal 38. When the battery is in a relatively low state of charge, the third electrode voltage will be of relatively low level, indicative of relatively low oxygen partial pressures within the battery cell or cells 28 of the battery 26. However, as the battery attains a fully recharged condition, the third electrode voltage supplied at the terminal 38 will increase, indicating that larger amounts of generated oxygen is present in the battery cells. If the battery obtains an overcharged condition, the third electrode voltage will increase to a level indicating that the battery is fully charged. Accordingly, as will be hereinafter explained in detail, the charging current supplied to the battery will be reduced, thereby obviating the danger that the battery seals will be ruptured by excessive oxygen partial pressures generated therein.

By reference yet to FIG. 1, with the battery in a relatively low state of charge, relatively low levels of oxygen partial pressures are present in the battery cells 28. The voltage $E_{3rd}$ across the third electrode resistor $R_{3rd}$ remains relatively low. Accordingly, the sensing voltage $E_S$ will comprise almost entirely the voltage $E_{CLM}$ across the coulometer 36 and the current limiting resistor $R_L$. The coulometer 36 operates in the well known manner such that the coulometer state of charge is directly proportional to the ampere-hours replaced in the battery 26 by the initial charging current. Accordingly, the coulometer signal $E_{CLM}$ increases rapidly as the battery ampere-hours replaced equals the ampere-hours previously expended. The voltage signal $E_{CLM}$ will increase above the predetermined sensing signal voltage of the sensing circuit 20. The sensing circuit 20 in response to the exceeded signal level will activate the series regulator 16 to cease the further flow of charging current to the battery 26. In actual practice, however, charging current to the battery will not be entirely interrupted. More particularly, in the well known operation of the coulometer 36, when the ampere-hours of the battery 26 are fully replaced the coulometer 36 will approach or attain a fully "set" condition, whereby its presence in the circuit illustrated in FIG. 1 is that of a relatively large resistance interposed between the junction 40 and the terminal 14. Accordingly, the flow of initial charging current will be diverted around the coulometer 36 and through the trickle resistor $R_{CL}$, the ohmic value of which is considerably less than that of the coulometer 36 in its fully "set" or nearly fully "set" condition. Accordingly, by properly selecting the ohmic value of the trickle resistor $R_{CL}$ the initial charging current will be reduced to a lower level as the coulometer 36 rapidly approached its fully "set" condition. Such reduction of the charging current level is highly desirable. Because a nickel-cadmium battery is only 85-90% efficient, the battery is not fully charged when the coulometer reaches its fully set condition. Accordingly, additional charging current is required subsequent to the described operation of the coulometer.

Continued recharging of the battery 26 occurs at a substantially reduced charging current level dependent upon the ohmic value of the trickle resistor $R_{CL}$. As the battery attains its fully charged condition, the oxygen partial pressures within the cells increase in the well known manner. More particularly, the increasing oxygen partial pressures within the third electrode cell or cells 28 produce a proportional progressively increasing voltage at the terminal 38. Thus, as increasing oxygen partial pressures are generated within the cell or cells 28, the voltage $E_{3rd}$ across the third electrode resistor $R_{3rd}$ will correspondingly increase. The sensing voltage $E_S$ will increase correspondingly, thereby reducing the charging current to progressively lower levels as the battery 26 obtains its fully charged condition. Such reduction is highly advantageous since the third electrode output to the terminal 38 suffers from a low response to the actual oxygen partial pressure within the cell or cells 28. Accordingly, by progessively reducing the charging current level as the oxygen partial pressures are sensed at the terminal 38, the specific termination of the charging current may be accomplished without dangerously overcharging the battery before the sensing of the critical oxygen partial pressures. As the sensing voltage $E_S$ increases in response to the increasing third electrode voltage $E_{3rd}$, it will attain the predetermined level at which the sensing circuit 20 activates the regulator 16. Upon such actuation of series regulator 16 further supply of charging current to the battery will be terminated, whereby the battery will be in a fully recharged or safe overcharged condition. In practice, it may be desirable to continue charging current to the battery at low levels at which pressure cycling and heat generation in the battery may be minimized. Such practice will be explained in detail hereinbelow.

It should be understood that the apparatus illustrated in FIG. 1 supplies charging current to the battery 26 at levels dependent upon its state of charge when the solar cell panels become illuminated. For example, when the solar panels become illuminated and charging current thereby becomes available, the coulometer 36 may be initially near its fully "set" condition. Accordingly, the initial charging currents supplied to the battery 26 will be at a lower level than that which would be supplied when the coulometer is not near its fully set condition.

Figure 3:
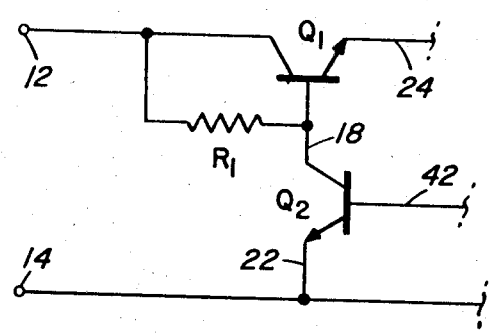
FIG. 3 is a schematic diagram particularly illustrating a specific series regulator and sensing circuit of the preferred embodiment illustrated in FIG. 1.

With reference to FIG. 3, a specific embodiment of the series regulator 16 and the sensing circuit 20 is illustrated. Accordingly, the series regulator 16 comprises an NPN transistor $Q_1$ with its collector connected to the terminal 12 and its emitter connected to the conductor 24. A biasing resistor $R_1$ is connected to the terminal 12 and the base of the transistor $D_1$. The sensing circuit 20 comprises an NPN transistor $Q_2$, the collector of which is connected to the base of the transistor $Q_1$ by way of the conductor 18. The emitter of transistor $Q_2$ is connected to the terminal 14 by way of the conductor 22. The base of the transistor $Q_2$ is connected to the terminal 42. In operation, charging current is supplied to the battery 26 through initially turned on transistor $Q_1$. The sensing voltage $E_S$ provides the turn on bias voltage for the transistor $Q_2$. More particularly, when the level of $E_S$ obtains a predetermined level, the transistor $Q_2$ will be biased to a conducting state whereby the transistor $Q_1$ will be biased to a non-conducting state. The charging current will thus be reduced to the battery 26.

It is readily apparent that the circuit of FIG. 3 represents a preferred embodiment of a series dissipating regulator adapted for use in the apparatus illustrated in FIG. 1.

Figure 2:
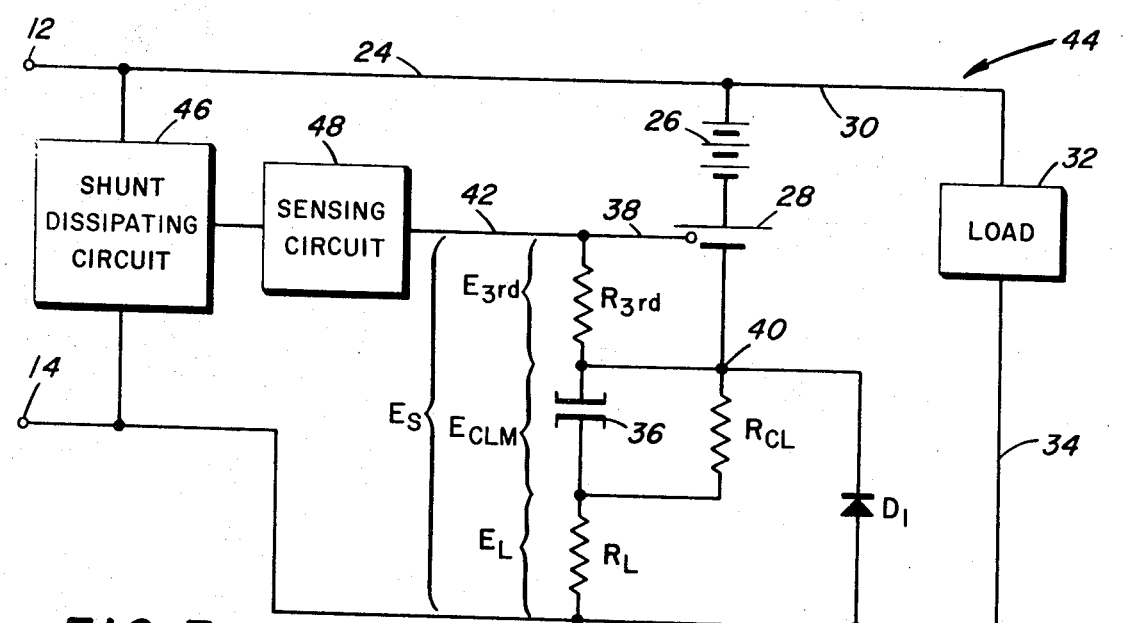
FIG. 2 is a schematic diagram of another preferred embodiment of the battery charging circuit according to the invention and particularly illustrating a dissipating type of regulator.

With more particular reference to FIG. 2, there is illustrated generally at 44 one modification of the device as illustrated in FIG. 1. According to the modification, the series regulator 16 is replaced by a shunt dissipating circuit 46 connected between the two terminals 12 and 14 of the device as illustrated in FIG. 2. The sensing circuit 20 is replaced by a sensing circuit 48 connected between the shunt dissipating circuit 46 and the conductor 42. As a further modification, the trickle resistor $R_{CL}$ is connected in series with the current limiting resistor $R_L$. Resistor $R_{CL}$, connected as shown in FIG. 2, is equally adapted to FIG. 1 and vice versa. In operation of the device illustrated in FIG. 2, reference will be made to the figure, taken in conjunction with FIG. 4, the latter figure representing the relative values (not to any particular scale) comprising the component parts of the sensing voltage $E_S$ vs. the relative state of charge or overcharge of the battery. With reference to the figures, the battery 26 is supplied with initial charging current available from an illuminated solar cell array, not shown, adapted for connection between the terminals 22 and 14. The level of initial charging current is determined by the ohmic value of the current limiting resistor $R_L$. When the coulometer 36 senses that the ampere-hours previously expended by the battery 26 has been replaced by the initial charging current, the voltage $E_{CLM}$ thereacross will rapidly increase, whereby the sensing voltage $E_S$ correspondingly increases rapidly. When the sensing voltage $E_S$ obtains a predetermined level, the sensing circuit 48 will activate the shunt dissipating circuit 46 to divert the flow of charging current and instead of being diverted entirely from the battery 26 will instead be reduced to a lower supply level. More particularly, as the ampere-hours of the battery become fully replaced, the coulometer 36 will approach a fully set condition and thereby appear as a very large resistance interposed between the junction 40 and the current limiting resistor $R_L$. Accordingly, the current will be diverted around the coulometer 36 and through the trickle resistor $R_{CL}$. The charging current supplied to the battery is thus supplied at a level determined by the ohmic values of the trickle resistor $R_{CL}$ and the current limiting resistor $R_L$. Accordingly by proper selection of the trickle resistor ohmic value, the initially supplied charging current may be substantially reduced in level as the coulometer 36 approaches its "set" condition.

With reference to the graph of FIG. 4, the charging current supplied to the battery is represented by the line labeled $I_B$, which line is superimposed upon the graph illustrating the signal voltages $E_{3rd}$, $E_{CLM}$ and $E_L$ varying with the relative state of charge or overcharge of the battery 26.

As the battery is continuously charged by the reduced level charging current, the oxygen partial pressures within the cell or cells 28 increase, thereby supplying a correspondingly progressively increasing voltage at the terminal 38. In response to the increasing pressure the signal voltage $E_{3rd}$ across the third electrode resistor $R_{3rd}$ increases. Accordingly, the sensing voltage $E_S$ increases in response to the increasing signal voltage $E_{3rd}$. The charging current correspondingly will decrease in level with the increasing sensing voltage $E_S$. When the sensing voltage $E_S$ obtains the predetermined level the sensing circuit 48 will activate the shunt dissipating circuit 46 to divert the flow of charging current away from the battery 26, whereby the supply of current to the battery is terminated.

With reference to the graph, section A thereof represents the period in which charging of the battery 26 is accomplished by a charging current $I_B$ at a level determined by the ohmic value of the current limiting resistor $R_L$. The sensing voltage $E_S$ comprises approximately 90% of the voltage $E_L$ across the current limiting resistor, and approximately 10% divided between the voltage $E_{3rd}$ across the third electrode resistor, and the voltage $E_{CLM}$ across the coulometer 36. As shown in the graph, it is apparent that the current limiting resistor $R_L$ has a larger ohmic value than does the coulometer 36. However, with reference to the abscissa, when the ampere-hours are replaced by the charging current, the coulometer voltage rapidly increases. Accordingly, the graph illustrates the voltage $E_{CLM}$ across the coulometer rapidly increasing in response thereto as the coulometer approaches its fully set condition. At that point, the charging current is diverted around the coulometer 36 and supplies the battery 26 through the trickle resistor $R_{CL}$. Thus, as shown in section B of the graph, the level of charging current $I_B$ is substantially reduced to a lower level. Again with reference to section B of the graph, the voltage $E_{CLM}$ is thus measured across the trickle resistor $R_{CL}$ and comprises substantially 80% to 90% of the total sensing voltage $E_S$. However, as the battery is being charged by the reduced level charging current, the oxygen partial pressures within the cell or cells 28 will increase, whereby the voltage $E_{3rd}$ will correspondingly rise. With reference yet to section B of the graph, when the rising voltage $E_{3rd}$ comprises approximately more than 10% of the sensing voltage $E_S$, the charging current $I_B$ will be correspondingly decreased to even lower levels.

With reference to section C of the graph, the voltage $E_{3rd}$, across the third electrode resistor, is shown to rise even further until it comprises approximately 80–90% of the sensing voltage $E_S$. In response thereto, the charging current $I_B$ is reduced to even lower levels as the battery attains a safe overcharged condition. As shown in the graph, the third electrode voltages then remain at a maximum level, at which point the sensing circuit 48 will activate the shunt dissipating circuit to terminate the flow of additional charging current to the battery 26. In actual practice, it is desirable to overcharge the battery to a safe level. This is accomplished by sensing the presence of oxygen in the battery cell or cells. Such presence of oxygen is indicative of the overcharge condition for the battery. As the battery is overcharged by a charging current having a safely reduced level determined by the ohmic value of the trickle resistor $R_{CL}$, the battery is thus permitted to charge to maximum efficiency at safe charge rate, whereby excessive oxygen pressure build up and pressure cycling the battery cell seals are minimized. As the battery goes further into overcharge, the third electrode signal $E_{3rd}$ begins to increase, as illustrated in section C of the graph. Accordingly, the charging current for the battery is maintained but at further reduced levels. Such lower levels are desirable in order to prevent the generation of heat and pressure cycling in the battery as it approaches its fully charged efficiency.

Other modifications and embodiments of the present invention are apparent without departure from the spirit and scope of the invention. For example, the placement of the trickle resistor $R_{CL}$ may be any type of constant or variable current limiting means placed in series or in parallel with the current limiting resistor $R_L$ and the current limiting resistor $R_L$ may be entirely eliminated. Further, the third electrode-coulometer structure may be connected to the battery anywhere and not necessarily at the most negative portion as shown in the drawings. Accordingly, the spirit and scope of the invention is to be limited only in the recitation of the appended claims.

What is claimed is:

1. A battery charging circuit comprising: a pair of terminals adapted for connection to a source of battery charging current, a battery, a coulometer in series with the battery, said battery and said coulometer being connected between the said terminals, a current limiting means connected in parallel with the coulometer and in series with the battery, at least one cell of said battery being a third electrode type, a third electrode resistor connected in series with the current limiting means and to the third electrode type cell, a voltage sensing circuit connected to the third electrode type cell, and control means for terminating the flow of charging current to said battery, said voltage sensing circuit being operable in response to the sum of voltages across said coulometer and said third electrode resistor to activate said control means.

2. The structure as recited in claim 1, wherein said control means comprises a shunt dissipating circuit connected between said terminals.

3. The structure as recited in claim 1, wherein said control means comprises a series dissipating regulator connected between one of said terminals and said battery, and said sensing circuit is connected to the other of said terminals and to the series dissipating regulator.

4. The structure as recited in claim 1, wherein said control means comprises a series switching regulator connected between one of said terminals and said battery, and said sensing circuit is connected between the other of said terminals and said series switching regulator.

5. The structure as recited in claim 3, wherein said series dissipating regulator comprises a transistor having its collector connected to one of said terminals and its emitter connected to said battery, said sensing circuit comprises a second transistor with its collector connected to the base of the first transistor, the emitter of said second transistor is connected to the other of said terminals, and the base of said second transistor is connected to the third electrode type cell.

6. The structure as recited in claim 1, and further including a current limiting resistor connected in series with said coulometer.

7. The structure as recited in claim 1, and further including a current limiting resistor connected in series with the parallel combination of said coulometer and said current limiting means, said battery, said current limiting means and said current limiting resistor connected between said terminals.

8. The structure as recited in claim 1, wherein said current limiting means is a trickle resistor and further including a diode connected in series with said battery and in parallel with said coulometer.

References Cited

UNITED STATES PATENTS

| | | |
|---|---|---|
| 2,578,027 | 12/1951 | Tichenor. |
| 3,005,943 | 10/1961 | Jaffe _____ 320—46 X |
| 3,302,091 | 1/1967 | Henderson. |
| 3,348,118 | 10/1967 | Watrous. |
| 3,417,307 | 12/1968 | Kosa et al. |
| 3,417,308 | 12/1968 | Mandel et al. |
| 3,421,067 | 1/1969 | Wilson et al. |
| 3,444,439 | 4/1969 | Hoeksema _____ 324—94 |

J. D. MILLER, Primary Examiner

J. M. GUNTHER, Assistant Examiner

U.S. Cl. X.R.

320—46; 324—29.5, 94